F. A. EUSTIS.
ART OF AND APPARATUS FOR TREATMENT OF CORROSIVE GASES.
APPLICATION FILED DEC. 19, 1917.
1,265,893.
Patented May 14, 1918.
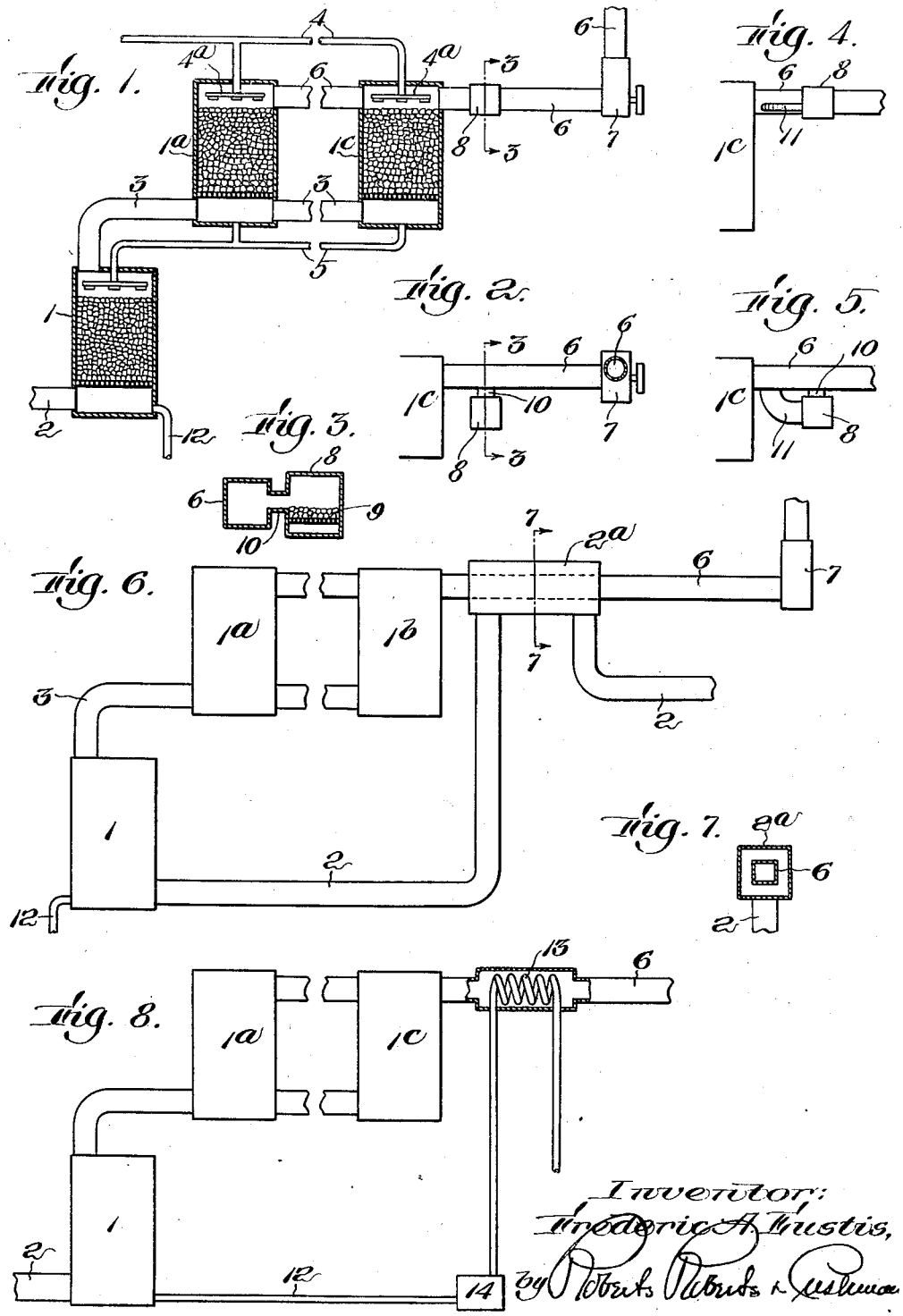

UNITED STATES PATENT OFFICE.

FREDERIC AUGUSTUS EUSTIS, OF MILTON, MASSACHUSETTS.

ART OF AND APPARATUS FOR TREATMENT OF CORROSIVE GASES.

1,265,893.                    Specification of Letters Patent.    Patented May 14, 1918.

Application filed December 19, 1917. Serial No. 207,954.

*To all whom it may concern:*

Be it known that I, FREDERIC A. EUSTIS, a citizen of the United States, and resident of Milton, in the county of Norfolk and State of Massachusetts, have invented new and useful Improvements in the Art of and Apparatus for Treatment of Corrosive Gases, of which the following is a specification.

In the operation of industrial establishments of many kinds, gases are produced containing various corrosive acids or their anhydrids, which, under certain conditions, are very destructive of the flues and apparatus used for disposing of the gases or for their treatment in case they are subjected to treatment, as for the utilization, recovery or removal of some content. For example, such acid gases are present in the furnace gases of smelting plants, in the exhaust from the pickling rooms of iron works or galvanizing works, in the smoke from sintering plants, in the ventilation currents from charging storage batteries and other electrochemical reaction vats, and in many other places. Such gases when they include liquids in a globular, condensed or condensing state, or in the presence of water or moisture, attack and rapidly corrode and destroy the metals, mortars, enamels, paints and cements commonly used in the flues, fans and other apparatus used for disposing of, treating or conveying the gases. Fans and other equipment of acid proof material have been used but are for many reasons not wholly satisfactory.

The principal object of the present invention is to provide an art of and means for preventing corrosion of (without use of special protective coatings for) the usual flues, fans, or other apparatus made of material vulnerable to attack by the acids. The gases and vapors in question are characteristically bearers of acids or anhydrids of acids and are practically harmless except in the state of condensation, partial or complete, or in the presence of liquid water, and my invention contemplates the rendering harmless of such acid bearing gases by depriving their acid or anhydrid contents of water in a state adaptable for combination, as by raising their temperature above the dew point or otherwise depriving them of liquid acids or of free water or other liquid in a state adaptable for combination into an acid so that they will pass through the flue, fan or other apparatus by which they are disposed of, in a harmless condition hereinafter referred to as a dry state.

An important application of the invention is in connection with furnace gases from smelting and sintering plants, and particularly in connection with the recovery of by-products such as $SO_2$ (sulfur dioxid) from such furnace gases; and I will therefore describe the present invention as applied to a process and apparatus for recovering $SO_2$ from furnace gases. It is to be understood, however, that this mention of a species of the method and apparatus is merely by way of illustration of the genus rather than of limitation except in so far as the limitation is expressed in the claims, and that the invention is of general application to other situations and other uses where gases containing destructive acids such as the oxacids of sulfur or their anhydrids or combining element, are handled in flues and apparatus parts of which it is desirable to protect.

In the recovery of $SO_2$ from furnace gases in apparatus such as that shown in an application for Letters Patent of the United States filed by Utley Wedge and myself May 29, 1915, Serial No. 31,208, or in an application filed by Utley Wedge and myself July 10, 1915, Serial No. 39,099, it has been found that after the furnace gases have been passed through scrubbing towers, where they are brought into contact with water or other liquid capable of absorbing $SO_2$, they remain very destructive of the flues, fans or other apparatus through which they pass before being discharged into the atmosphere. Various materials have been tried to withstand the corrosive effect of these gases, but these possess many disadvantages; and various paints and coatings have been applied to the apparatus for resisting the acids, but without success. Notwithstanding the greater part of the $SO_2$ has been removed from the furnace gas in the scrubbing towers it still contains enough corrosive acids ($H_2SO_3$ and others) to attack and rapidly destroy the metals, mortars and cements, ordinarily used in the flues and apparatus for disposing of the furnace gases.

I have discovered that this destructive corrosive effect is due to the fact that the gases come from the scrubbing towers to the flue, fan or other apparatus with their liquid content in part in fog, or globular form, since the scrubbing materially cools the hot gases, and so lowers the power of the gas to hold in solution the container water vapor, whether or not actual condensation occurs; that is, reduces the gas below the dew-point of its contained vapor. Moreover, when the gases come to the scrubber comparatively dry, as in the case of gases from copper converters, the scrubbers may add water vapor to the content of the gases, thereby rendering the gases the more injurious. On the other hand, when the gases come to the scrubbers hot and moist, as from a sintering plant, the effect of the scrubbing process is to precipitate out some of the moisture, nevertheless leaving sufficient water vapor to be injurious. By slightly heating the gases sufficiently to raise their temperature above the dew-point appropriate to the amount of vapor contained and before they pass through the apparatus used for disposing of them, I have succeeded in avoiding satisfactorily destructive action of these gases. My method of depriving the gases of condensed liquids comprises the idea generally of depriving such gases of condensed liquid, also the idea of doing that when moisture is increased by the scrubbers, also the idea of depriving the gases of moisture by the combined effect of precipitating part of the moisture by the cooling effect of the scrubbers and thereafter heating to raise the temperature of the gases above the dew-point of the contained water vapor. Moreover, when wet furnace gases are discharged into the atmosphere they remain visible and unsightly, and are suspected of damage to neighboring metals and foliage, whereas when they are made sensibly dry before they emerge they become almost invisible and attain a wider dilution in the air.

In the accompanying drawings which illustrate diagrammatically certain embodiments of the invention,—

Figure 1 is a side elevation, partly in section, of apparatus containing the invention;

Fig. 2 is a detail view, in plan, showing the heater and flue;

Fig. 3 is a section on line 3—3 of Fig. 1;

Fig. 4 is a side elevation of a modification;

Fig. 5 is a plan view of the parts shown in Fig. 4;

Fig. 6 is a side elevation illustrating another modification;

Fig. 7 is a section on line 7—7 of Fig. 6; and

Fig. 8 is a side elevation of still another modification.

Referring first to Figs. 1, 2 and 3, of the drawings: 1, 1ª, 1ᶜ, etc., (of which there may be any desired number, the connecting pipes between 1ª and 1ᶜ being broken to indicate the omission of one or more similar towers) represent a series of towers, tanks or like chambers. The tower 1 is packed with coke, slag or other material in such form that liquid descending through the tower will present an extensive superficial area for contact with the gases from the furnace. These gases enter the tower at or near the bottom through the pipe 2, and escape at or near the top through pipe 3 into the towers 1ª, etc. Water or other liquid capable of absorbing $SO_2$ is admitted at the top of towers 1ª, 1ᶜ, etc., through pipe 4 and is distributed from suitable headers 4ª over masses of coke or other insoluble material, or masses of limestone or other soluble material which will increase the capacity of the liquid to absorb $SO_2$, or masses of part soluble material and part insoluble material, with which the towers 1ª, 1ᶜ, etc., are packed. The liquid is conducted from towers 1ª, 1ᶜ, etc., (or if desired a separate source of supply may be used) into the top of tower 1 and distributed over the packing therein.

The liquid from the towers, containing $SO_2$ which has been absorbed from the gases is then carried to apparatus (not shown) for recovering the $SO_2$.

The furnace gases after having been thus washed or scrubbed to remove nearly the whole or the greater part of the $SO_2$, escape from the upper part of the towers 1ª, 1ᶜ, etc., through the pipe or flue 6 to the atmosphere. A fan 7, installed in flue 6 forces the gases out, or the gases may be passed through other apparatus before they emerge into the atmosphere, for the purpose of recovering or removing other components.

The gases entering the flue 6 from the last of the scrubbing towers are wet or moist owing in part to evaporation and absorption by them of scrubbing water and in part to the cooling and the consequent condensation which takes place in the washing treatment. In order to treat the gases upon their emergence from the scrubbing towers in a manner to preserve the flue and the propelling fan or other apparatus from corrosion, I cause their contained liquids to be vaporized and absorbed, preferably by the gases themselves. It is sufficient in most cases to heat the gases slightly by means of a suitable heater arranged as close as practicable to the last of the series of scrubbing towers. In practice, in the case of fumes containing $SO_2$, it is necessary to raise the temperature only a little, say about 5° F. over that at which the gases emerge from the towers to bring them a little above the dew-point, and so make them sensibly dry by re-absorption of the contained liquid. It will be understood that temperature at which the gases are delivered may vary with the seasons, the particular by-product recovery apparatus and other factors, and that the amount of reheating necessary to prevent condensation may be varied accordingly.

The heater may consist of a furnace as shown at 8 in Figs. 1, 2 and 3, having a grate 9 adapted for the burning of coal or other suitable fuel. Air enters below the grate from the atmosphere and passes with the products of combustion through pipe 10 into flue 6 where it mixes with the gases passing through flue 6 and raises them to the proper temperature to dry the gases.

Instead of drawing its air from the atmosphere to maintain combustion, the furnace 8 may be connected below the grate by a pipe 11 leading from the flue 6, as shown in Figs. 4 and 5. This arrangement possesses the advantage both that the volume of the gases in flue 6 which must be taken care of by the flue, fan or other propulsion apparatus, is not increased by admitting air from outside, and also that the gases entering the furnace from the flue 6 are usually somewhat warmer than the atmosphere and therefore require less heating in the furnace.

Other heaters such as steam heaters, hot water heaters, or electric heaters, might be used in place of the furnace 8.

Or, in place of an independent heating plant such as the furnace 8, a source of heat derived from heat heretofore wasted in the apparatus itself can be and preferably is used. For example, the furnace smoke entering tower 1 through the flue 2 is very hot, and if brought into contact with pipe 6 its heat can be employed to heat the gases in flue 6 by suitable apparatus for this purpose, such as illustrated in Figs. 6 and 7, wherein the flue 2 for delivering the furnace gases to the tower 1, includes a casing or trunk 2ª surrounding the flue 6. The hot furnace gases passing through the trunk 2ª on the way to the tower warm the gases passing through flue 6.

Other modes of raising the temperature of the effluent gas in flue 6 by utilizing the heretofore waste heat of the furnace or other hot gas being treated, such as by causing the outlet pipe 12, which carries off the hot water from tower 1, to be connected with a heating coil 13 in flue 6 to warm the gases therein, as illustrated in Fig. 8, thus utilizing the heat of the water warmed by the hot gases in tower 1, will occur to those skilled in the art. A pump 14 may be used to maintain the circulation of hot air or fluid in a heating coil such as the coil 13.

While my method and apparatus is particularly useful in the treatment and recovery of contents of waste gases, it will be understood that in many situations where such effluent gases are not treated for recovery application of the above described steps will be useful for the prevention of damage.

I claim:

1. The art of rendering normally corrosive gases less harmful comprising raising the temperature of the gases above the dew-point with respect to the contained liquids.

2. The art of treating effluent gases bearing an anhydrid of an acid from a source which delivers them with condensed water-vapor into apparatus vulnerable to such acids, for the purpose of rendering them less harmful, comprising raising the temperature of the gases above the dew-point of the contained water-vapor before they enter such apparatus.

3. The art of treating effluent gases bearing an acid anhydrid from a source which delivers them with condensed water-vapor into apparatus vulnerable to such acids, for the purpose of rendering them less harmful, comprising raising the temperature of the gases above the dew-point of the contained water-vapor and maintaining such temperature during the passage of the gas through such apparatus.

4. The art of treating effluent acid bearing gases from a source which delivers them with condensed water-vapor into apparatus vulnerable to such acids in the presence of water, for the purpose of rendering them less harmful, comprising raising the temperature of the gases above the dew-point with respect to the contained water-vapor during its passage from such source to such apparatus.

5. The art of treating gases containing anhydrids of the oxacids of sulfur comprising maintaining the gases at a temperature above the dew-point of their contained water-vapor whereby to prevent formation of such acids in parts of the apparatus employed which may be subject to corrosion thereby.

6. The art of treating gases containing anhydrids of the oxacids of sulfur comprising first cooling the gases and extracting a part of their anhydrid contents and thereafter maintaining the residue of the gases at a temperature above the dew-point of their contained water-vapor whereby to prevent formation of such acids in parts of the apparatus employed which may be subject to corrosion thereby.

7. The combination in apparatus for treating normally corrosive gases of means for scrubbing the gases, means for conveying the gases from the scrubbing means to atmosphere, and means for heating the gases before passage through said conveying means, whereby to prevent formation of corrosive liquid contents in the conveying means.

8. Gas treating apparatus comprising cooling and condensing elements, means for delivering the gases in a hot state to said elements, a conveying duct for gases effluent from said elements, and means for heating the effluent gases comprising a radiating surface in contact with the effluent gases and adapted to be heated by heat derived from the inflowing gases.

9. Gas treating apparatus having therein means for delivering hot gases to a scrubber, means for conveying the scrubbed gas to atmosphere, and means for preventing corrosion in the conveying means comprising a heater utilizing the waste heat of the hot gases.

10. The combination in means for treating gases having a corrosive content such as an anhydrid of an oxacid, of scrubbing means for removing a part of the corrosive contents, conveying means for delivering the residue to atmosphere, or other apparatus and a heater between the scrubbing means and the conveying means adapted and arranged to raise the effluent gases to a temperature exceeding the dew-point of the liquid contents of said effluent gases.

11. In gas treating apparatus, the combination of means for progressively depriving the gases of condensed liquids consisting of a scrubber adapted to condense and remove a part of the condensable liquid and a heater acting on the gas effluent from the scrubber adapted to raise the effluent gas above the dew-point of the contained liquid vapor.

Signed by me at Quebec, Canada, this 14th day of Dec., 1917.

FREDERIC AUGUSTUS EUSTIS.